United States Patent
Banerjee et al.

(10) Patent No.: US 11,561,850 B1
(45) Date of Patent: Jan. 24, 2023

(54) SYSTEM AND METHOD FOR PERFORMING FAILURE ANALYSIS ON A COMPUTING SYSTEM USING A BAYESIAN NETWORK

(71) Applicant: VMware, Inc., Palo Alto, CA (US)

(72) Inventors: Sujeet Banerjee, Bangalore (IN); Umar Shaikh, Bangalore (IN); Kiran Kumar Cherivirala, Bangalore (IN); Avhinav Vijay Bhagwat, Pune (IN); Sureshbabu Koyadan Chathoth, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/506,602

(22) Filed: Oct. 20, 2021

(51) Int. Cl.
*G06F 11/07* (2006.01)

(52) U.S. Cl.
CPC ........ *G06F 11/079* (2013.01); *G06F 11/0751* (2013.01)

(58) Field of Classification Search
CPC ........................... G06F 11/079; G06F 11/0751
See application file for complete search history.

(56) References Cited

U.S. PATENT DOCUMENTS

| | | | |
|---|---|---|---|
| 7,783,582 B2 * | 8/2010 | Doctor ................... | G16H 10/40 706/12 |
| 10,528,450 B2 * | 1/2020 | Hassan ................ | G06F 11/0709 |
| 11,080,161 B2 * | 8/2021 | Higashiyama .......... | G06F 11/10 |
| 2021/0026895 A1 | 1/2021 | Banerjee et al. | |
| 2021/0028985 A1 | 1/2021 | Banerjee et al. | |

OTHER PUBLICATIONS

Wikipedia, "Bayes' theorem", retrieved from the internet Oct. 5, 2021, 15 pgs.
Wikipedia, "Bayesian network", retrieved from the internet Oct. 5, 2021, 15 pgs.
Polencic, Daniele, "How do you visualise dependencies in your Kubernetes YAML files?", published May 2019, 8 pgs.
Kelleher, John D. et al. "Fundamentals of machine learning for predictive data analytics", (2015), Chapter 6, 66 pgs.
Ramoni, Marco F., "Bayesian Networks Learning From Data", Harvard-MIT Division of Health Sciences and Technology, HST951 (2003), 38 pgs.
Gormley, Matt, "Bayesian Networks (Part II)", Lecture 23, Apr. 12, 2017, 36 pgs.

* cited by examiner

*Primary Examiner* — Nadeem Iqbal
(74) *Attorney, Agent, or Firm* — Loza & Loza, LLP

(57) ABSTRACT

A system and method for performing a failure analysis on a computing system uses a Bayesian network that is generated from a correlation directed acyclic graph (CDAG) of nodes that represent entities in the computing system with edge weights for edges between the nodes. The CDAG is generated using log entries of the computing system with reference to a dictionary file, which specifies entity types, dependency types of the entity types, expressions that return values representing prior probabilities of failure for the dependency types, and the edge weights for the dependency types. The Bayesian network generated from the CDAG includes conditional probabilities for edges of the Bayesian network based on the edge weights of the CDAG. The Bayesian network is used to compute posterior probabilities of possible causes of a new failure event in the computing system and output at least one probable cause with an associated posterior probability for the new failure event.

20 Claims, 13 Drawing Sheets key$_A$:
  action: <<  >>
  P$_{\Pi}$ : <<*inputs, lambda-expression*>>
  dependencies:
    subType: subKey$_B$
      xpaths: [//X1, //X2, ...]
      weight-vector: [(0.1), (0.5), ...]
      relationshipType: "mount"
    subType: subKey$_C$
      xpaths: [//X11, //X12, ...]
      weight-vector: [(0.1), (0.5), ...]
      relationshipType: "env"

subKey$_B$ : ... *so on* ...

```
pod:
  action: <<>>
  P_Π : <<(x, x_parent) => 1 if x.phase == 'Failed' or 'Unknown' 0 if x.phase == 'Running'
         or 'Succeeded' else 0.6>> (represents the probability of failure, given the Pod phase)
  dependencies:
    - subType: cm
      xpaths: [//spec/containers/env//configMapKeyRef/name,
              //spec/containers/envFrom//configMapRef/name ...]
      weight-vector: [(0.3)]
      relationshipType: "env"
    - subType: pv
      xpaths: [//spec/volumes[True]/name, ...]
      weight-vector: [(0.8)]
      relationshipType: "mount"

cm:
  action: <<>>
  P_Π : <<(x, x_parent, y, ...) => 1 if x == nil else 0.7 if x.immutable else 0.1>> (represents
         the probability of failure, given the CM phase)
  dependencies: []

pv:
  action: <<>>
  P_Π : <<(x, x_parent) => 1 if x.phase == 'Failed' else 0 if x.phase == 'Bound' else 0.3 >>
         (represents the probability of failure, given the PV phase)
  dependencies: []
```

FIG. 7B

SYSTEM AND METHOD FOR PERFORMING FAILURE ANALYSIS ON A COMPUTING SYSTEM USING A BAYESIAN NETWORK

BACKGROUND

Troubleshooting a highly dynamic computing environment, such as a Kubernetes environment, is a challenging task, due to a complex network of references across various resources in the computing environment, e.g., Deployment, Services, Ingress, Pods, ConfigMaps, PersistentVolumes, etc. in the Kubernetes environment. Due to this complex network of resource dependencies, trying to find the root cause for a failure in such a computing environment requires not only knowledge about the resource dependencies, but also the dependencies that are most likely involved in the failure.

There are a number of tools that are currently available to help analyze the dependencies in a computing environment. However, these tools merely provide visualization of the resources and their performance metrics so that a user can determine the most probable cause among potential causes for a failure event in the computing environment. Thus, there is a need for a better solution to find the root causes of failures in a highly dynamic computing environment.

SUMMARY

A system and method for performing a failure analysis on a computing system uses a Bayesian network that is generated from a correlation directed acyclic graph (CDAG) of nodes that represent entities in the computing system with edge weights for edges between the nodes. The CDAG is generated using log entries of the computing system with reference to a dictionary file, which specifies entity types, dependency types of the entity types, expressions that return values representing prior probabilities of failure for the dependency types, and the edge weights for the dependency types. The Bayesian network generated from the CDAG includes conditional probabilities for edges of the Bayesian network based on the edge weights of the CDAG. The Bayesian network is used to compute posterior probabilities of possible causes of a new failure event in the computing system and output at least one probable cause with an associated posterior probability for the new failure event.

A computer-implemented method for performing a failure analysis on a computing system in accordance with an embodiment of the invention comprises: receiving log entries of the computing system, wherein the log entries include information regarding entities in the computing system; generating a correlation directed acyclic graph (CDAG) of nodes that represent the entities in the computing system with edge weights for edges between the nodes using the log entries of the computing system with reference to a dictionary file, wherein the dictionary file specifies entity types, dependency types of the entity types, expressions that return values representing prior probabilities of failure for the dependency types, and the edge weights for the dependency types; generating a Bayesian network from the CDAG with the edge weights, wherein the Bayesian network includes conditional probabilities for edges of the Bayesian network based on the edge weights of the CDAG; based on a new failure event in the computing system, computing posterior probabilities of possible causes of the new failure event using the Bayesian network, wherein the possible causes are select entities in the computing system and wherein the posterior probability of each possible cause is based on the conditional probability of an edge of the Bayesian network associated with that possible cause and a return value of the expression for that possible cause; and outputting at least one probable cause with an associated posterior probability for the new failure event based on the computed posterior probabilities of the possible causes, wherein the at least one probable cause is selected from the possible causes of the new failure event. In some embodiments, the steps of this method are performed when program instructions contained in a non-transitory computer-readable storage medium are executed by one or more processors.

A system in accordance with an embodiment of the invention comprises memory and at least one processor configured to: receive log entries of a computing system, wherein the log entries include information regarding entities in the computing system; generate a correlation directed acyclic graph (CDAG) of nodes that represent the entities in the computing system with edge weights for edges between the nodes using the log entries of the computing system with reference to a dictionary file, wherein the dictionary file specifies entity types, dependency types of the entity types, expressions that return values representing prior probabilities of failure for the dependency types, and the edge weights for the dependency types; generate a Bayesian network from the CDAG with the edge weights, wherein the Bayesian network includes conditional probabilities for edges of the Bayesian network based on the edge weights of the CDAG; based on a new failure event in the computing system, compute posterior probabilities of possible causes of the new failure event using the Bayesian network, wherein the possible causes are select entities in the computing system and wherein the posterior probability of each possible cause is based on the conditional probability of an edge of the Bayesian network associated with that possible cause and a return value of the expression for that possible cause; and output at least one probable cause with an associated posterior probability for the new failure event based on the computed posterior probabilities of the possible causes, wherein the at least one probable cause is selected from the possible causes of the new failure event.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which:

FIG. 3 shows a generic dictionary file used by a correlation processor of the failure analysis system in accordance with an embodiment of the invention.

FIG. 7B shows a simplified dictionary file for the example shown in FIG. 7A in accordance with an embodiment of the invention.

Throughout the description, similar reference numbers may be used to identify similar elements.

DETAILED DESCRIPTION

Figure 1:
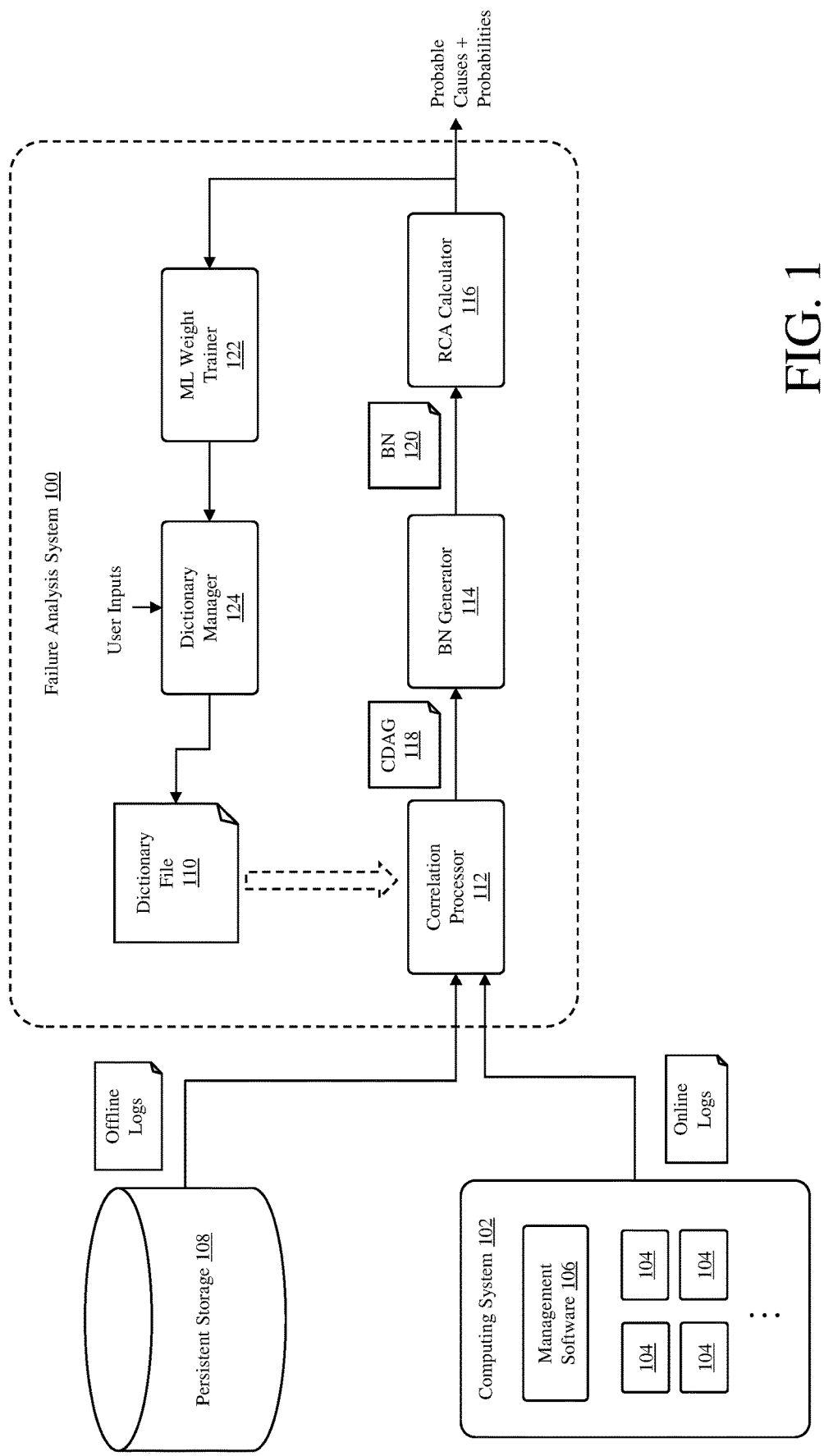
FIG. 1 is a block diagram of a failure analysis system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

In a computer network ecosystem, such as a Kubernetes (K8S) ecosystem, failures often lead to engineers analyzing lots of logs and events from the ecosystem, and possibly from the underlying cloud provider as well to find root causes of the failures. Due to the expanse of log text that needs to be processed and analyzed, a root cause analysis (RCA) requires multiple domain experts working numerous hours before coming to a likely most probable cause (MPC) for a failure.

In addition, it is often difficult to find the real root cause of a given failure, out of many probable low-lying failures or events that may be the root cause. What is needed is a measure of likelihood of a cause being the true root cause, which would allow the reported problem to be fix as soon as possible within tight service level agreement (SLA) timelines.

Information that is needed as a probable cause of a failure is: {Cause_statement, Bayesian_probability}, where "Bayesian_probability" represents the probability that the given "Cause_statement" is likely to be the real cause of a given/reported failure. This is also known as posterior probability in literature. Given a list of probable causes, one could make a choice to address the more probable causes out of many, based on the value of "Bayesian_probability". Higher "Bayesian_probability" indicates the higher priority one would want the cause to be addressed, before the others.

In many domains, such as aerospace, space science and nuclear science, the adoption of Bayesian networks or other Bayesian-based networks, e.g., Bayesian belief networks (BBNs) or tree-augmented naïve Bayesian networks (TANs), is quite common. Those, however, require vast domain expertise to come up with the Bayesian network and the associated local probabilities, which are typically based on data collected over many years. Thus, using this traditional approach to create Bayesian networks for RCA management in computer networks would require significant amount of time and resources.

Current tools for RCA management assist engineers to analyze the dependencies in an application running in a computer network system using monitoring agents deployed in the system. However, these tools do not simply provide a probable root cause of a failure with a measure of likelihood of being the root cause, out of several potential causes of failures. In addition, these tools appear to not take into account the previous occasions of false alarms to avoid them in subsequent events.

Turning now to FIG. 1, a block diagram of a failure analysis system 100 in accordance with an embodiment of the invention is shown. As described in detail below, the failure analysis system 100 uses a Bayesian network (BN), which is derived from a directed acyclic graph (DAG) of correlated entities in a computing system, to provide the most probable cause (MPC) of an actual or hypothetical failure with a quantitative measure of the likelihood that the MPC is the actual cause. Although the failure analysis system 100 is described herein as providing failure analysis with respect to certain types of computing systems, such as a Kubernetes (K8S) system, the failure analysis system can provide failure analysis for any computing systems, including infrastructure as a service (IaaS), containers as a service (CaaS) and other cloud-based systems.

As illustrated in FIG. 1, the failure analysis system 100 can receive, as input, logs from a computing system 102 of interest, which may be any type of a computing system with hardware and software components that support execution of software processes, including various applications. The logs from the computing system 102 include entries, which may be, but not limited to, records of transactions, operations and messages between entities 104 in the computing system, as well as events, actions, decisions and state or status changes involving the various entities in the computing system. The entities 104 in the computing system can be any software or hardware components in the computing system 102, as well as any software constructs used in the computing system. In a K8S system, entities may include clusters, nodes, Pods, controllers, schedulers, artifacts and resources, such as Deployment, Services, Ingress, Pods, ConfigMaps, PersistentVolumes, etc. Thus, logs in a K8S system may include records of transactions, operations and messages between these K8S entities, and various events, such as Hypertext Transfer Protocol (HTTP) access logs, pod state or status changes, controller actions and scheduler decisions. In some embodiments, the logs may be in the form of files, which may be text files that specify various log entries. As used herein, the term "logs" refers to log files that include log entries. However, in some implementations, log entries rather than log files may be used for various embodiments.

The input logs may be directly from the live or operating computing system 102. These online logs may be from one or more management software 106 running in the computing system 102 and/or the underlying infrastructure provider, e.g., a public cloud provider, which monitors the computing system. The logs that are input to the failure analysis system 100 may also be from a persistent storage 108. These offline logs may be historical logs for the computing system 102 that have been stored in the persistent storage 108 for subsequent use, e.g., for failure analysis. Thus, the failure analysis system 100 may receive logs exclusively from the persistent storage 108, exclusively from the live computing system 102, or both.

The input logs are used by the failure analysis system 100 to produce a correlation directed acyclic graph (CDAG) of entities 104 in the computing system 102 using a dictionary file 110, which is used to correlate the different entities in the computing system and associate probabilities between correlated components, as explained below. The CDAG is converted to a Bayesian network, which can then be used to determine probable causes of an actual or hypothetical failure in the computing system 102 with corresponding probabilities, including the MPC for the failure.

In any computing system, entities in the system interact with each other to perform various tasks. Thus, there is a dependency between the interacting entities, which can be exploited for failure analysis because a cause of a failure of one entity may be caused by another entity on which the failed entity depends. An example of an entity of a computing system with dependency relations with other entities of the system is illustrated in FIG. 2.

Figure 2:
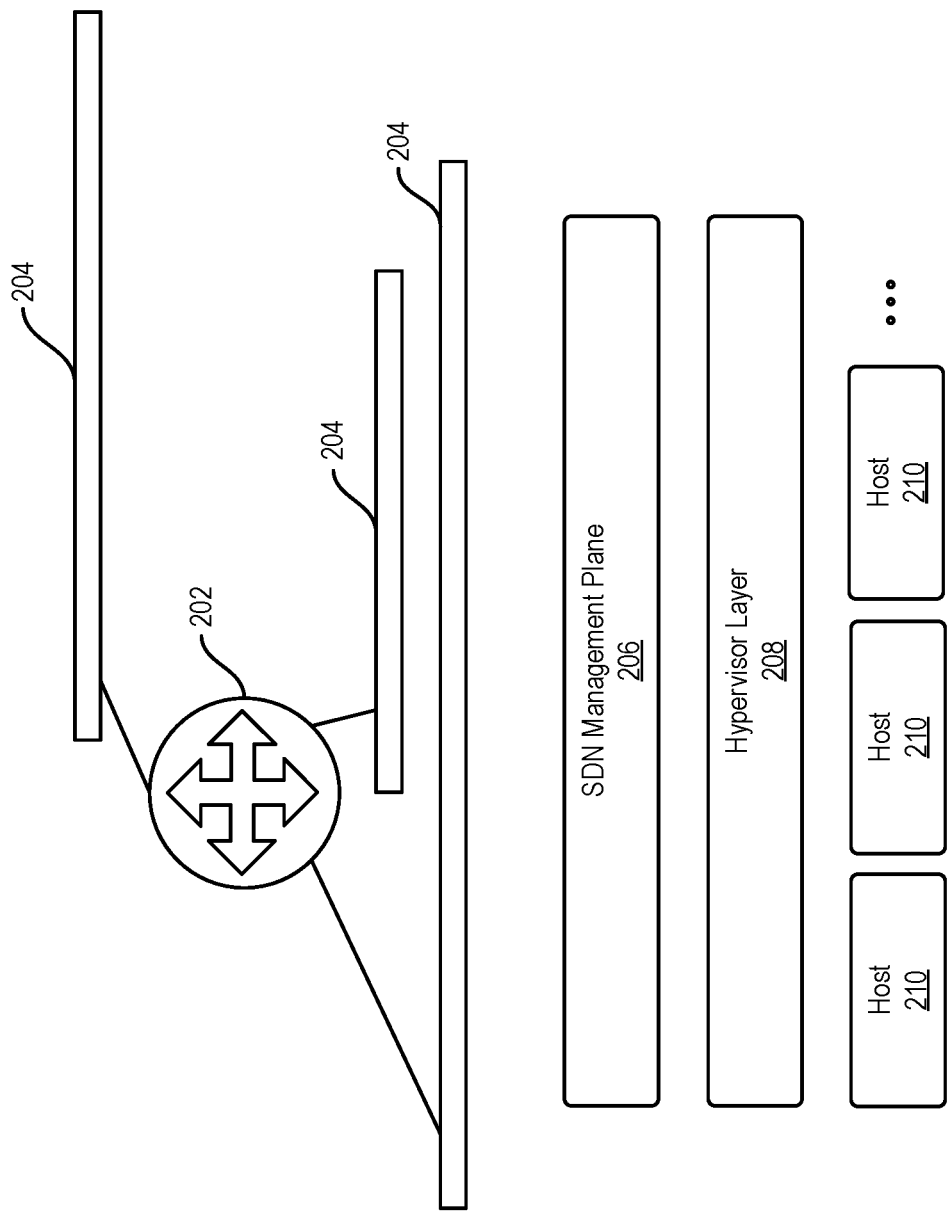
FIG. 2 is a diagram of a software-defined networking (SDN) component shown with parts of an SDN environment with which the SDN component interacts in accordance with an embodiment of the invention.

As shown in FIG. 2, a software-defined networking (SDN) component 202 is shown with parts of an SDN environment with which the SDN component interacts. In this example, the SDN component 202 is a virtual router of a computing system. The parts of the SDN environment with which the virtual router 202 interacts include logical/overlay networks 204, an SDN management plane 206 and a hypervisor layer 208, which resides in different host computers 210. The state of the virtual router 202 includes router configurations and interface configurations, which can be captured for failure analysis. In addition, since the virtual router 202 interacts with other parts of the surrounding SDN environment, the state of these SDN parts should also be captured for the virtual router for failure analysis. As illustrated in FIG. 2, the state of the logical/overlay networks 204 includes network configurations, layer 3 (L3) information and virtual local area network (VLAN)/virtual extensible LAN (VXLAN) states. The state of the SDN management plane 206 includes the state of SDN controllers included in the management plane. The state of the hypervisor layer 208 includes network input/output chains. Thus, the state of all these different parts or components of the surrounding SDN environment should be captured to properly perform failure analysis of the virtual router 202. As described below, the failure analysis system 100 uses at least some of this information regarding the interactions of different components in the computing system to produce a Bayesian network, which is used for failure analysis.

Turning back to FIG. 1, the failure analysis system 100 includes a correlation processor 112, a Bayesian network generator 114 and a root cause analysis (RCA) calculator 116. The correlation processor 112 operates to generate a CDAG 118, which includes nodes representing entities in the computing system 102 and edges that represent dependencies between the nodes (entities), using the logs from the live computing system 102 and/or from the persistent storage 108. The direction of an edge in the CDAG between two nodes indicate the dependency between the nodes. An edge from a source node to a target node indicates that the source node is dependent on the target node. Each edge includes a weight vector that represents a local probability (which is a conditional probability in Bayesian probabilities) for that edge. The local probability of an edge is the conditional probability that a failure of the source node is caused by the target node.

The correlation processor 112 uses the dictionary file 110 to construct the CDAG 118 for the computing system 102. The dictionary file 110 is a document file that is like a rule book, which tells the correlation processor 112 what to look for and what to do when it is found in the input logs, in order to produce the CDAG 118. An example of a generic dictionary file 300 is illustrated in FIG. 3.

In the example shown in FIG. 3, a generic dictionary file 300 specifies a number of keys, e.g., $key_A$, and, under each key, an action, a lambda expression and dependencies. Each key, e.g., $key_A$, represents the name of vendor-specific entity (e.g., dfw, ipset, ip, securitygroup, vm, . . . ). Thus, the keys specify entity types that can be found in the input logs. The associated action, if unspecified, defaults to fetching the definition of the associated key for example, via representation state transfer (REST) application programming interface (API), using the identification (ID) in case of object, or finding the correlation function, e.g., the lambda, if the key is a primitive/atomic value (e.g., an Internet Protocol (IP) address). The action also encapsulates API endpoint details.

The lambda expression is a return type that results in a value with floating point decimal. The value that is returned is between 0 and 1 (both inclusive), which represents the prior probability of failure of the construct represented by the key. As shown in FIG. 3, in this example, the lambda is denoted as $P_\Pi(x)$, where x would be bound to the corresponding resource identified by a subKey under one of the dependencies. As explained below, this lambda is going to be used by the RCA calculator 116 to derive, from the status of a logged and/or monitored entity (identified by the corresponding subkey), the probability of whether the entity, e.g., a resource, has actually failed. The lambda may be implemented in any language of choice that supports lambda expressions, such as Java 1.8+, Python, Scala, JavaScript, and Ruby, to name a few. However, the lambda expression used in the dictionary file is not limited to only established programming or scripting languages. In some embodiments, the lambda expression used in the dictionary file may be implemented in any custom language or domain specific language (DSL) that processors are able to interpret or parse. A simple lambda example in a more pythonic language could be, $$P_\Pi(x, x\_parent, other\_attributes \ldots) ==> \{1 \text{ if } x.status=='failed' \text{ else } 0\}.$$

In some embodiments, attributes of an entity may be used to define an optional "scope" as one of the attributes in the lambda expression to limit the search to be done by the correlation processor 112. For a K8S ecosystem, a few examples of "scope" could be "namespace", "list of namespaces", or a "service account". For other domains, there could be similar bounding enclosures that may be used to define "scope".

Each dependency of a key is a list of structs {subType, xpaths}, where each struct specifies the sub-entity that should be searched for, within the definition of the key. For instance, within the key "$key_A$", there could be a dependency struct with subtype "$subKey_B$". In the CDAG 118 being constructed, the key will be represented as a parent node and the dependencies of the key will be represented as child nodes of that parent node. Thus, subkeys of a key specify the entity dependency types for the key that may be found in the input logs. The XPaths for a dependency specify the potential locations a particular subtype, e.g., "$subKey_B$", could exist within the definition of the key, e.g., "$key_A$".

In addition, each dependency includes a weight vector and a relationship type. The weight vector for a dependency includes one or more weights that would translate into a relative merit or priority in choosing one dependency (i.e., a child node in the CDAG 118 being constructed) over the other, emanating from the same key (i.e., a parent node in the CDAG being constructed) for failure analysis. The weights for all the subkeys under a given key are always <=1. That way, a local probability (also referred to as a conditional probability in Bayesian probabilities) for each edge in the CDAG 118 being constructed is represented by the weights. The relationship type specifies a human-readable predefined text or enumeration for easy identification and feedback from human experts for the dependency. These predefined texts are copied to the edges of the CDAG 118 being constructed by the correlation processor 112, which will also be included in a Bayesian network (BN) 120 that will be generated from the CDAG, for ease of identification or representation to the end users.

In operation, the correlation processor 112 processes the input logs using the dictionary file 110 to find keys and dependencies of the keys to produce the CDAG 118, which includes conditional properties associated with the edges in the CDAG. A simplified CDAG 400 for a K8S ecosystem that can be generated by the correlation processor 112 in accordance with an embodiment of the invention is illustrated in FIG. 4.

Figure 4:
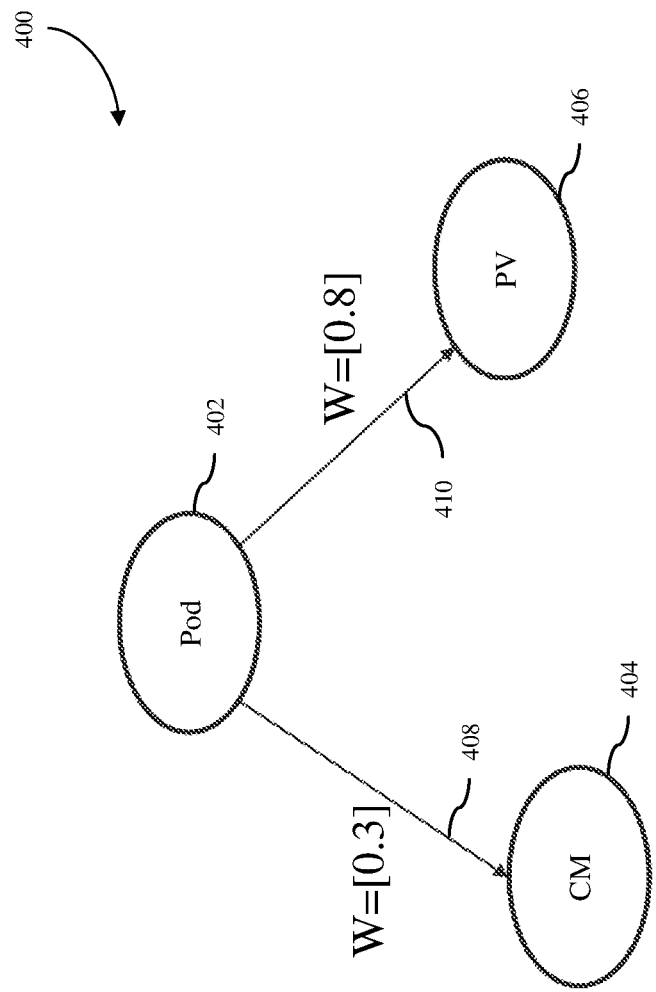
FIG. 4 is a diagram of a simple correlation directed acyclic graph (CDAG) generated by the correlation processor in accordance with an embodiment of the invention.

As shown in FIG. 4, the CDAG 400 includes nodes 402, 404, 406 with edges 408, 410. In this example, the node 402 represents a K8S Pod, and the nodes 404, 406 represents ConfigMap (CM) and PersistentVolume (PV), which are dependencies of the Pod represented by the node 402. The Pod and its dependencies, CM and PV, are discovered from the input logs by the correlation processor 112 using the dictionary file 110. The edge 408 from the Pod node 402 to the CM node 404 includes a weight vector of 0.3, while the edge 410 from the Pod node 402 to the PV node 406 includes a weight vector of 0.8. Thus, the local or conditional probability that the CM node 404 is the cause for a failure of the Pod node 402 is 0.3, and the local or conditional probability that PV node 406 is the cause for a failure of the Pod node 402 is 0.8. In this example, the weight vectors for the dependencies, CM and PV, are weight vectors with a single weight value.

In some embodiments, the correlation processor 112 may use techniques described in U.S. patent application Ser. No. 16/591,647, titled "System and Method for Migrating Configurations of Software-Defined Network Components," and/or U.S. patent application Ser. No. 16/591,654, titled "System and Method for Generating Correlation Directed Acyclic Graphs for Software-Defined Network Components," which are both incorporated herein by reference, to generate the CDAG 118. However, the correlation processor 112 employs the dictionary file 110, which is augmented to include more features than the dictionary file used in the U.S. patent application Ser. No. 16/591,647.

Turning back to FIG. 1, the Bayesian network generator 114 of the failure analysis system 100 operates to generate the Bayesian network 120 using the CDAG 118 produced by the correlation processor 112. In an embodiment, the Bayesian network 120 is generated by inverting or reversing the directions of the edges in the CDAG 118. In addition, a conditional probability table (CPT) is generated for each edge in the Bayesian network 120 from the weight vector of the corresponding edge in the CDAG 118. The CPT for each edge in the Bayesian network 120 includes a conditional probability, which is equal to the weight vector associated with that edge. The conditional probability for each edge in the Bayesian network 120 specifies a probability that the failure of the starting node of the edge is the cause of the failure of the ending node of the edge.

Figure 5:
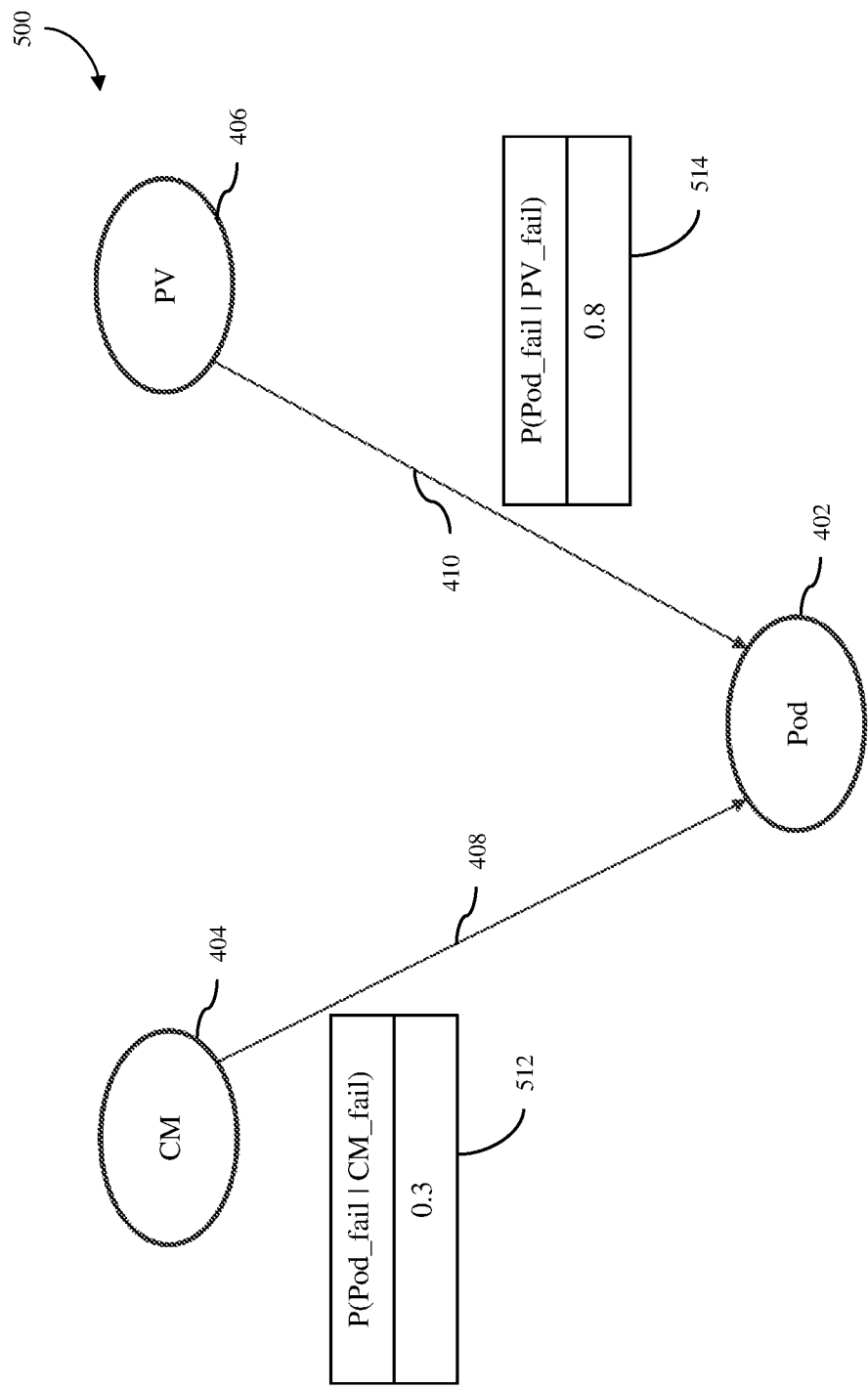
FIG. 5 is a diagram of a Bayesian network generated by a Bayesian network generator of the failure analysis system in accordance with an embodiment of the invention.

FIG. 5 illustrates a Bayesian network 500 derived from the CDAG 400 illustrated in FIG. 4 in accordance with an embodiment of the invention. As shown in FIG. 5, the directions of the edges 408, 410 in the CDAG 400 have been reversed in the Bayesian network 500 such that the edge 408 now points from the CM node 404 to the Pod node 402 and the edge 410 now points from the PV node 406 to the Pod node 402. In addition, CPTs 512, 514 have been generated for the edges 408, 410. The CPT 512 for the edge 408 include the conditional probability of 0.3 that a failure of the Pod node 402 is caused by the CM node 404 or P(Pod_fail|CM_fail)=0.3. The CPT 514 for the edge 410 includes the conditional probability of 0.8 that a failure of the Pod node 402 is caused by the PV node 406 or P(Pod_fail|PV_fail)=0.8.

Turning back to FIG. 1, the RCA calculator 116 of the failure analysis system 100 operates to calculate probabilities for each of the possible causes of a failure, which may be a failure that has occurred or a postulated failure, using the Bayesian network 120 produced by Bayesian network generator 114. That is, for each possible cause for a failure, the likelihood of that possible cause being the cause of the failure is calculated by the RCA calculator 116. In an embodiment, the RCA calculator 116 uses an equation based on Bayesian probabilities, as explained below.

From the definitions of Bayesian probabilities, the Bayes posterior probability of a probable cause Ci, given a failure event E, i.e., P(Ci|E), is given by:

$$P(Ci|E) = P_{conditional}(E|Ci) * P(Ci) / P(E),$$

where $P_{conditional}$ (E|Ci) is the conditional probability for the edge from Ci to E that is stored as a CPT in the generated Bayesian network 120, which is directly derived from the static weight vectors in the dictionary file 110 (from the key→subKey entries), P (Ci) is the prior probability that Ci has actually failed based on its status from the input logs, and P(E) is the general probability of a failure event E, which is estimated over a long running duration in a system. P (Ci) is the execution result of the lambda $P_\Pi$(Ci) corresponding to the subkey that generated the node Ci in the Bayesian network 120. P(E) usually acts as a normalizer in Bayesian Probability calculations. However, since RCA calculator 116 is calculating a likelihood of causes on a relative scale, P(E) can be set to 1 without the loss of generality. Thus, a further simplified formulation would be, $$P(Ci|E) = P_{conditional}(E|Ci) * P_\Pi(Ci) \quad \text{(Equation 1)}$$

In an embodiment, the RCA calculator 116 computes P (Ci|E) using Equation 1 for each of C1, C2, . . . , Cn, which are the known possible causes for the failure event E of interest. These known possible causes C1, C2, . . . , Cn for the failure event E are represented as parent nodes for the child node E in the Bayesian network 120 generated by the Bayesian network generator 114. Each of the parent nodes C1, C2, . . . , Cn may or may not have any contribution to the failure of the child node E. Thus, for each of the parent nodes C1, C2, . . . , Cn, the RCA calculator 116 computes "the likelihood of Ci being the cause of failure E, where Ci is one of C1, C2, . . . , Cn". Using the results from these calculations, the RCA calculator 116 reports the MPC and other more likely candidate causes based on the decreasing order of calculated posterior probabilities.

The results from the RCA calculator 116 may be provided to end users by any mechanism, such as a user interface (UI) or a website. In addition, the results from the RCA calculator 116 may be fed into a machine learning (ML) weight trainer 122, which operates to refine the appropriate conditional probability weights used in the dictionary file 110 based on past results or evaluations made by the RCA calculator 116. The ML weight trainer 122 may use any state-of-the-art ML techniques to optimize the conditional probability weights to continually improve the dictionary file 110 for more accurate failure analysis. In addition to the results from the RCA calculator 116, additional information may be input to the ML weight trainer 122 to improve the weights for better performance. The additional information may include errors found in the results after manual analysis of the results, e.g., where the actual cause of a failure is found to be something other than the MPC determined by the RCA calculator 116. In some embodiments, the ML weight trainer 122 may apply "Markov Blanket" formulations for statistically proven accuracies.

Any modifications of the weights for the dictionary file 110 that are recommended by the ML weight trainer 122 are input to a dictionary manager 124, which can create and edit the dictionary file 110 as needed. The dictionary manager 124 may also receive manual inputs that are entered by users. These manual inputs may include weight changes that are derived from feedbacks from various subject matter experts (SMEs) that have in-depth knowledge regarding the computing system 102 or related systems. Thus, the weights in the dictionary file 110 may be continually refined based on machine learning and expert feedbacks. It is noted here that the dictionary manager 124 may use initial default weights for the dictionary file 110 when the failure analysis system 100 is first initialized. After one or more failure analysis operations, the weights for the dictionary file 110 may be revised using recommendations from the ML weight trainer 122 and/or feedbacks from SMEs.

In operation, the same Bayesian network 120 is used by the RCA calculator 116 for failure analysis until the weights in the dictionary file 110 are modified. When the weights are modified, a new Bayesian network is generated by the Bayesian network generator 114 using an updated CDAG generated by the correlation processor 112 using the modified weights. Thus, the accuracy of the failure analysis system 100 will continue to improve as the weights in the dictionary file 110 are repeatedly fine-tuned.

Figure 6:
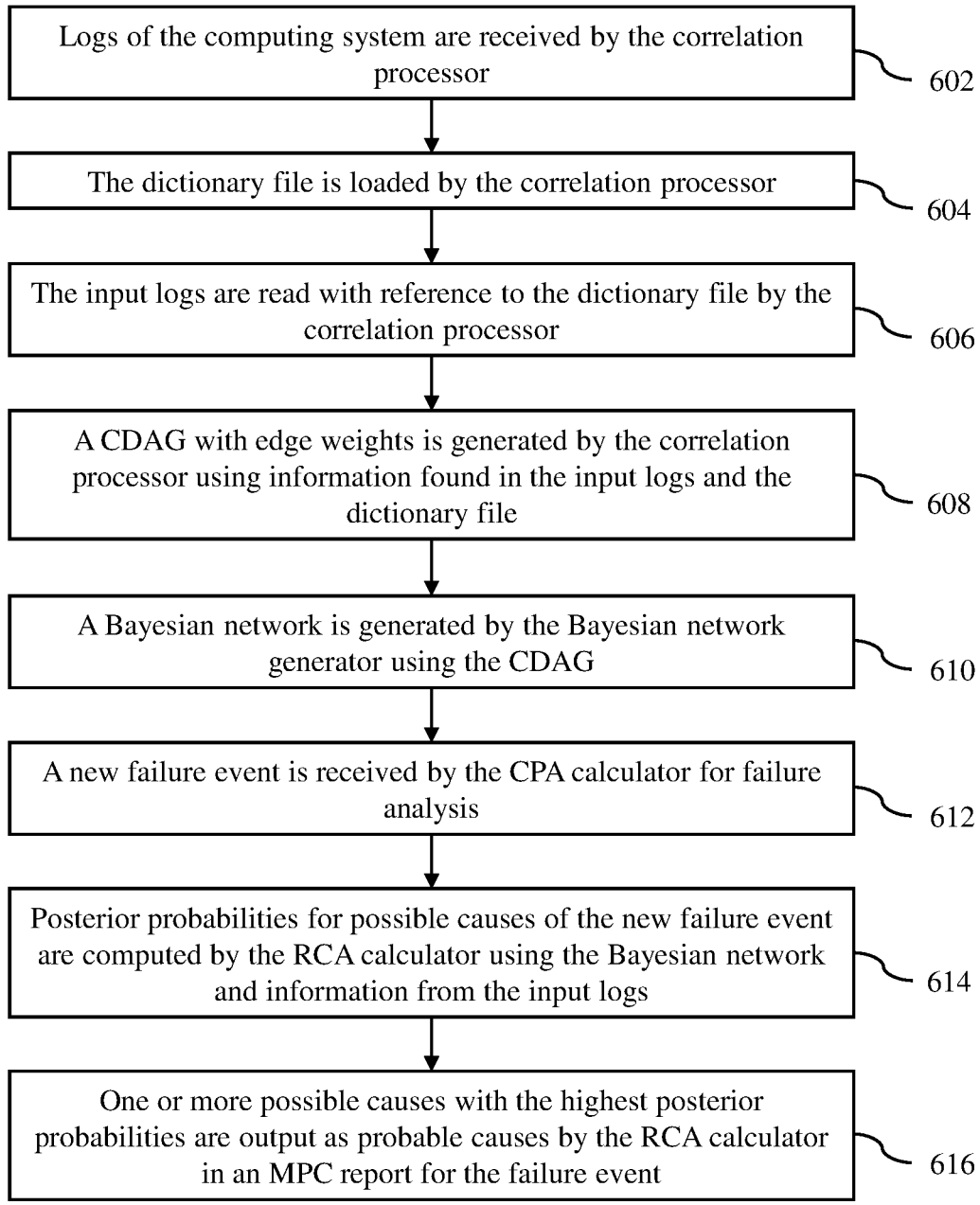
FIG. 6 is a process flow diagram of an operation of the failure analysis system in accordance with an embodiment of the invention.
Figure 7A:
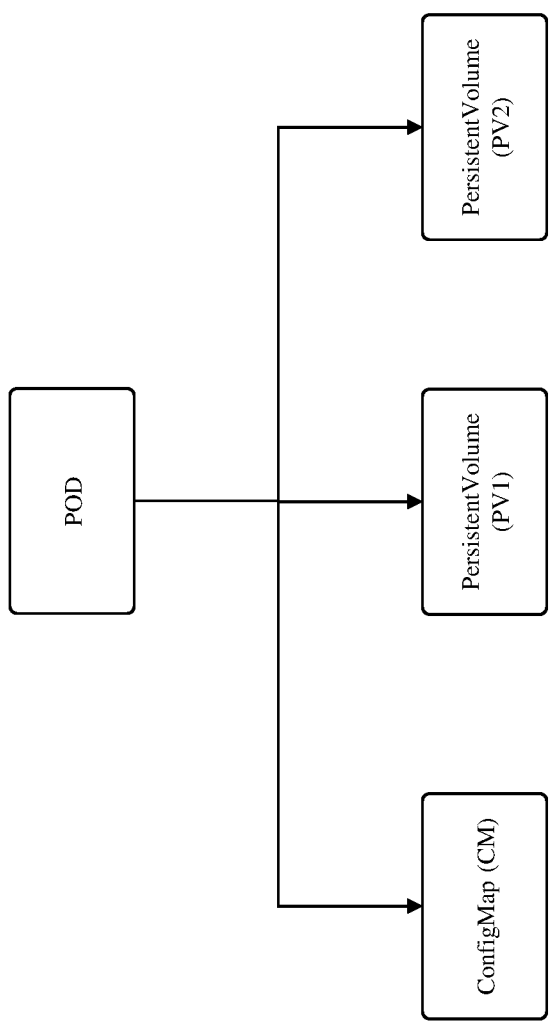
FIG. 7A shows an example of a Pod with one ConfigMap (CM) and two PersistentVolumes (PV1) and (PV2) dependencies in a K8S ecosystem in accordance with an embodiment of the invention.

An operation of the failure analysis system 100 in accordance with an embodiment of the invention is described with reference to a process flow diagram of FIG. 6 using an example of a Pod with one ConfigMap (CM) and two PersistentVolumes (PV1) and (PV2) dependencies in a K8S ecosystem, as illustrated in FIG. 7A. The operation begins at step 602, where logs of the computing system 102 of interest are received by the correlation processor 112 of the failure analysis system 100. The received logs may be offline logs from the persistent storage 108 and/or online logs from the live computing system 102.

Next, at step 604, the dictionary file 110 is loaded by the correlation processor 112. The dictionary file 110 may be retrieved from any persistent storage that is accessible by the correlation processor 112.

In FIG. 7B, a simplified dictionary file 710 that may be loaded by the correlation processor 112 for the example of FIG. 7A is shown. The dictionary file 710 includes a "Pod" key with "CM" and "PV" dependencies. The dictionary file also includes "CM" and "PV" keys, which also have their dependencies. Also shown in FIG. 7B are codes of the lambda expressions for the "Pod", "CM" and "PV", and examples of XPaths for the subKeys "CM" and "PV".

Next, at step 606, the input logs are read with reference to the dictionary file 110 by the correlation processor 112 to locate keys and dependencies of the keys in the logs, as well as weights for the found dependencies.

In the example shown in FIG. 7A, the Pod and its dependencies, the ConfigMap CM and the PersistentVolumes PV1 and PV2, are found in the input logs using the dictionary file 710 shown in FIG. 7B. In addition, the appropriate weights for the dependencies are assigned as set forth in the dictionary file 710. Specifically, a weight of 0.3 is assigned to the ConfigMap CM, and a weight of 0.8 is assigned to each of the PersistentVolumes PV1 and PV2.

Next, at step 608, a CDAG with edge weights is generated by the correlation processor 112 using information found in the input logs and the dictionary file 110. The keys and their dependencies that are found in the input logs using the dictionary file 110 are used to form the nodes of the CDAG and the relationships between the keys and their dependencies are used to form the edges of the CDAG. The weights that are assigned to the dependencies are used as the edge weights for edges from the key to the respective dependencies.

Figure 7C:
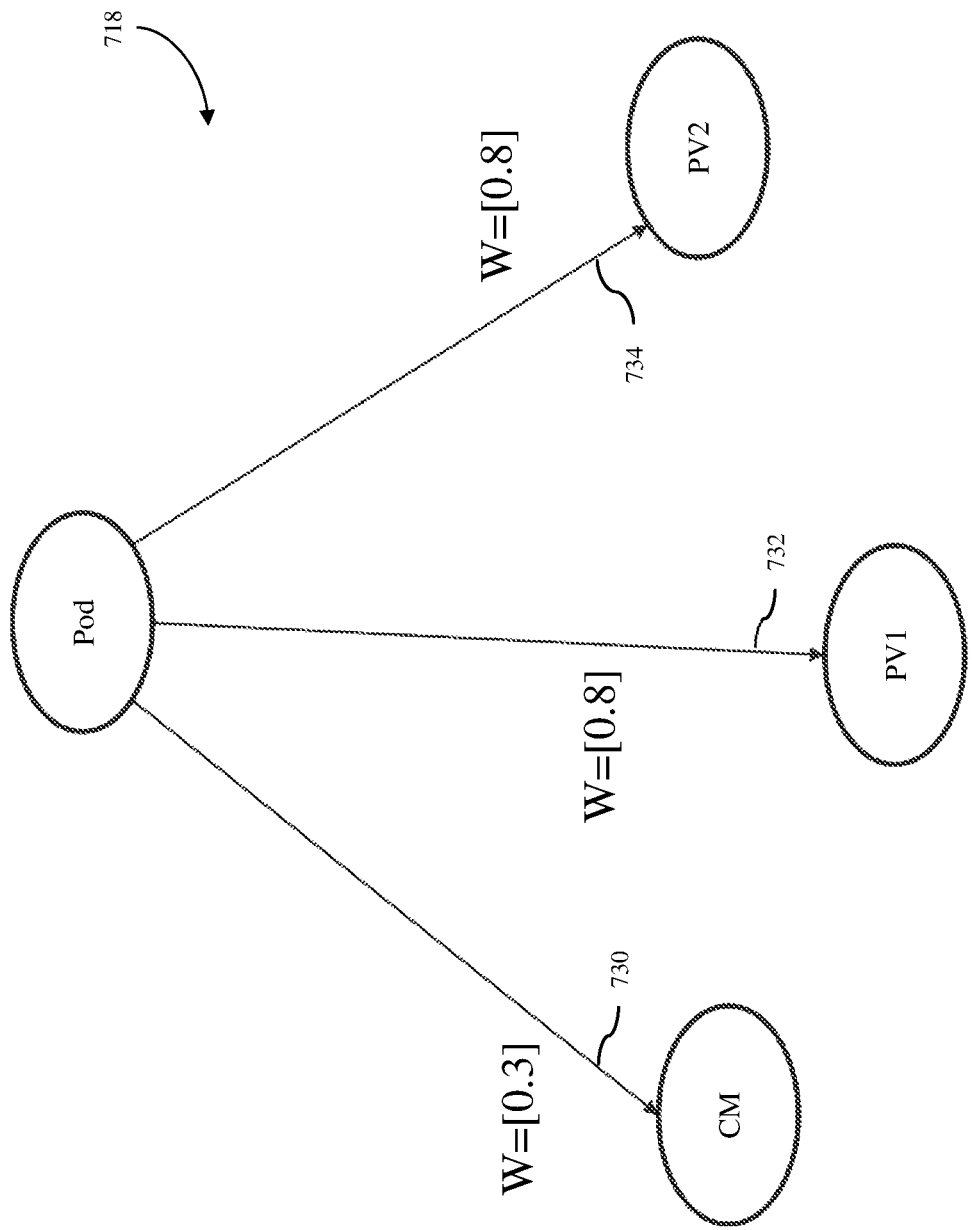
FIG. 7C shows a CDAG with edge weights that is generated for the example shown in FIG. 7A in accordance with an embodiment of the invention.

FIG. 7C show a CDAG 718 with edge weights that is generated by the correlation processor 112 for the example shown in FIG. 7A. The CDAG 718 includes a "Pod" node for the Pod, a "CM" node for the ConfigMap, a "PV1" node for the PersistentVolume PV1 and a "PV2" node for the PersistentVolume PV2. The CDAG 718 also includes edges 730, 732, 734 from the "Pod" node to the "CM", "PV1" and "PV2" nodes. The edges 730, 732, 734 are assigned with weights of 0.3, 0.8 and 0.8, respectively.

Next, at step 610, a Bayesian network is generated by the Bayesian network generator 114 using the CDAG provided by the correlation processor 112. The Bayesian network is generated by reversing the edges of the CDAG and using the weights of the edges to produce conditional probabilities for the edges. In some embodiments, the lambda expression for each of the nodes in the CDAG that represent dependencies may be stored in or associated with the Bayesian network.

Figure 7D:
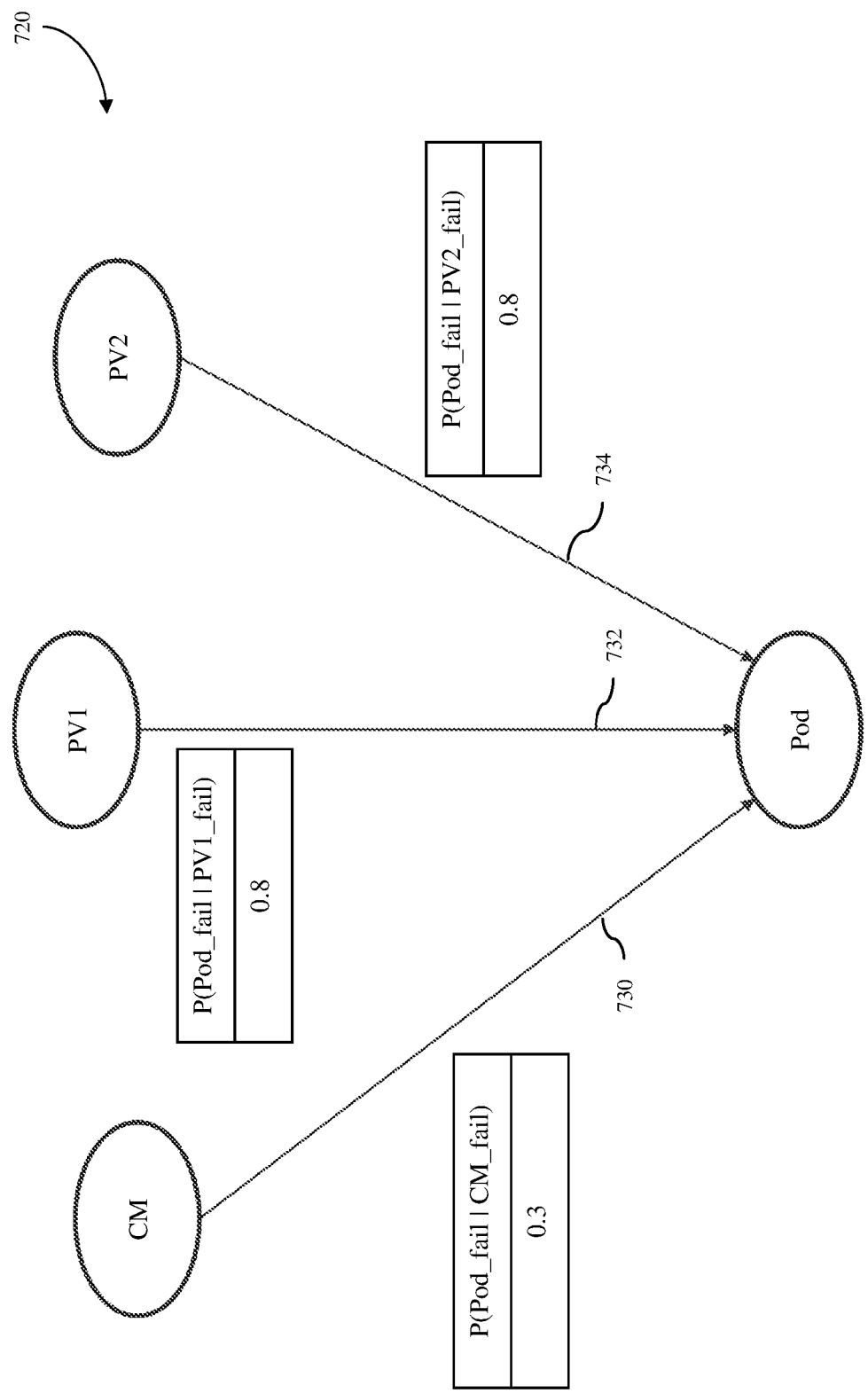
FIG. 7D shows a Bayesian network generated the CDAG shown in FIG. 7C in accordance with an embodiment of the invention.

FIG. 7D show a Bayesian network 720 generated by the Bayesian network generator 114 using the CDAG 718 from the correlation processor 112. Similar to the CDAG 718, the Bayesian network 720 includes the "Pod" node for the Pod, the "CM" node for the ConfigMap CM, the "PV1" node for the PersistentVolume PV1 and the "PV2" node for the PersistentVolume PV2. However, the directions of the edges 730, 732, 734 in the CDAG 718 have been reversed for the corresponding edges in the Bayesian network 720. In addition, a CPT has been created for each edge in the Bayesian network 720, which corresponds to the weight for the corresponding edge in the CDAG 718. Specifically, the CPT for the edge 730 specifies the conditional probability of a Pod failure, given that the ConfigMap CM has failed or P(Pod_fail|CM_fail) as 0.3. The CPT for the edge 732 specifies the conditional probability of a Pod failure, given that the PersistentVolume PV1 has failed or P(Pod_fail|PV_fail) as 0.8. Similarly, the CPT for the edge 734 specifies the conditional probability of a Pod failure, given that the PersistentVolume PV2 has failed or P(Pod_fail|PV2_fail) as 0.8.

Once the Bayesian network 120 is generated by the Bayesian network generator 114, the Bayesian network is ready to be used for failure analysis on a new failure event, which may be an actual failure event or a hypothetical or postulated failure event in the computing system 102. The failure event may involve failure of one or more entities in the computer system 102, such as an application running in the computing system. The same Bayesian network may be used repeatedly to make failure analyses on the computing system 102 until one or weights in the dictionary file 110 are updated, which would be reflected in a new CDAG and a corresponding new Bayesian network based on the new CDAG.

Next, at step 612, a new failure event is received by the CPA calculator 116 for failure analysis. The new failure event may be an actual failure event or a hypothetical failure event, which is entered into the failure analysis system 100 by an end user using an appropriate mechanism, such as a user interface.

Next, at step 614, posterior probabilities for possible causes of the new failure event are computed by the RCA calculator 116 using the Bayesian network and information from the input logs. In an embodiment, the RCA calculator 116 traverses the Bayesian network from the node or nodes involved in the new failure event to upper nodes that represent the dependencies of the starting nodes to compute posterior probability for each of the parent/ancestor (dependency) nodes in the Bayesian network using Equation 1. Thus, for a Bayesian network with multiple levels, the calculation of posterior probabilities at each level is done recursively, based on the posterior probability calculations of the previous level (i.e., the parent level), and so on. For the level with no parent nodes, the probabilities of (non-existent) parent nodes are set as 1.

Figure 7E:
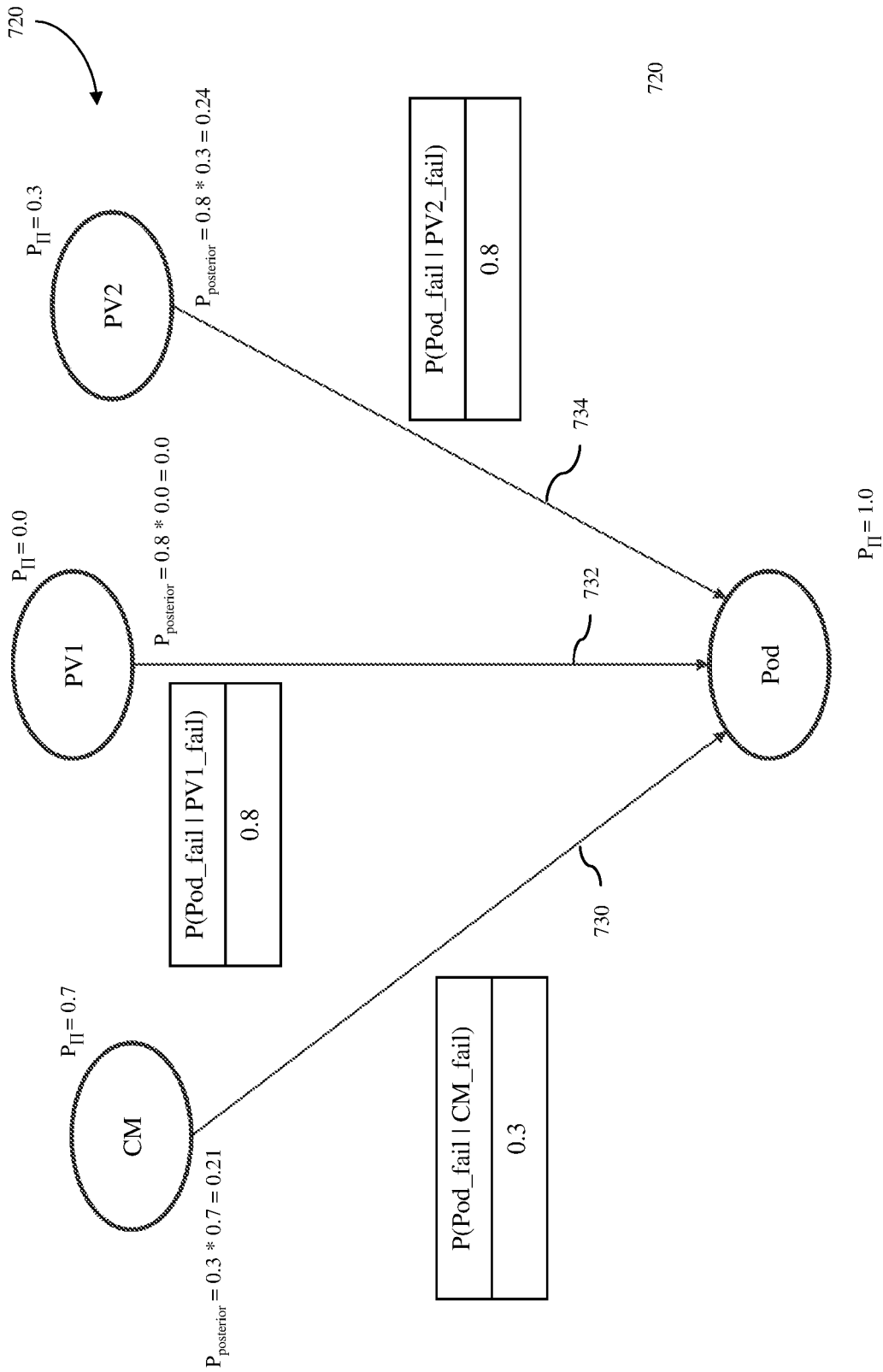
FIG. 7E illustrates an example of posterior probabilities computed using the Bayesian network shown in FIG. 7D in accordance with an embodiment of the invention.

FIG. 7E illustrates an example of posterior probabilities computed by the RCA calculator 116 using the Bayesian network 720 shown in FIG. 7D. In this example, it is assumed that the Pod represented by the "pod" node in the Bayesian network 720 has failed. Also, it is assumed that the PersistentVolume PV1 is "bound", the PersistentVolume PV2 is "available" and the ConfigMap CM is "immutable". These attributes are discovered from the input logs of the computing system 102. Due to these attributes, the lambda values for the different nodes are as follow:

"Pod" node: for "Failed", $P_\Pi = 1.0$ (see $P_\Pi$ for pod in FIG. 7B)

"CM" node: for "immutable", $P_\Pi = 0.7$ (see $P_\Pi$ for cm in FIG. 7B)

"PV1" node: for "bound", $P_\Pi = 0.0$ (see $P_\Pi$ for pv in FIG. 7B)

"PV2" node: for "available", $P_\Pi = 0.3$ (see $P_\Pi$ for pv in FIG. 7B)

Using Equation 1, i.e., $P(Ci|E) = P_{conditional}(E|Ci) * P_\Pi(Ci)$, the posterior probability for each of the nodes that are possible causes of the failed Pod, which in this example are the "CM", "PV1" and "PV2" nodes, are calculated. The computed posterior probabilities for these nodes are as follow:

"CM" node: $P_{posterior} = P_{conditional} * P_\Pi = 0.3 * 0.7 = 0.21$

"PV1" node: $P_{posterior} = P_{conditional} * P_\Pi = 0.8 * 0.0 = 0.0$

"PV2" node: $P_{posterior} = P_{conditional} * P_\Pi = 0.3 * 0.8 = 0.24$

Turning back to FIG. 6, next, at step 616, one or more possible causes with the highest posterior probabilities are output as probable causes by the RCA calculator 116 in an MPC report for the failure event, which includes the probable causes and their posterior probabilities. In an embodiment, the MPC report produced by the RCA calculator 116 lists the probable causes in order based on the their posterior probabilities. As an example, the MPC report may first list the probable cause with the highest posterior probability, which is the MPC, followed by the probable cause with the second highest posterior probability and so on.

In the example shown in FIG. 7E, the MPC report may include the following:

(1) PersistentVolume PV2 —with 24% likelihood (or 0.24)

(2) ConfigMap CM—with 21% likelihood (0.21)

This MPC report makes sense given the scenario in the example, where there is no evident cause of the failure because all the component resources (i.e., the ConfigMap CM, PersistentVolume PV1 and PersistentVolume PV2) are seemingly performing normally and without errors. However, the cause of the failure could still be a normally operating component, which in this example could be the PersistentVolume PV2, which is still not "bound", or the ConfigMap CM, which is "immutable", in that order.

The MPC report will change depending on the current attributes of dependencies. For example, if ConfigMap CM gets deleted, the $P_\Pi$ for ConfigMap CM becomes 1.0. In this scenario, the posterior probability for the ConfigMap CM would be $1.0 * 0.3 = 30\%$, which would be higher than the posterior probability for the PersistentVolume PV2. Thus, in this scenario, the ConfigMap CM would be the MPC for the Pod failure.

It is noted here that 100% likelihood of an RCA is seldom possible because the normalizing denominator has been removed in Equation 1 that is used by the RCA calculator 116. It is also noted that some of the weights used in the example are initial weights. However, with machine learning and feedback features of the failure analysis system 100, the weights will be enhanced over time to increase the accuracy of the system, when calculating or predicting failure likelihoods. It is further noted that the example described herein is overly simplified. In a real scenario, there could be hundreds of nodes and associated probabilities or more, which can be managed by the failure analysis system 100.

Figure 8:
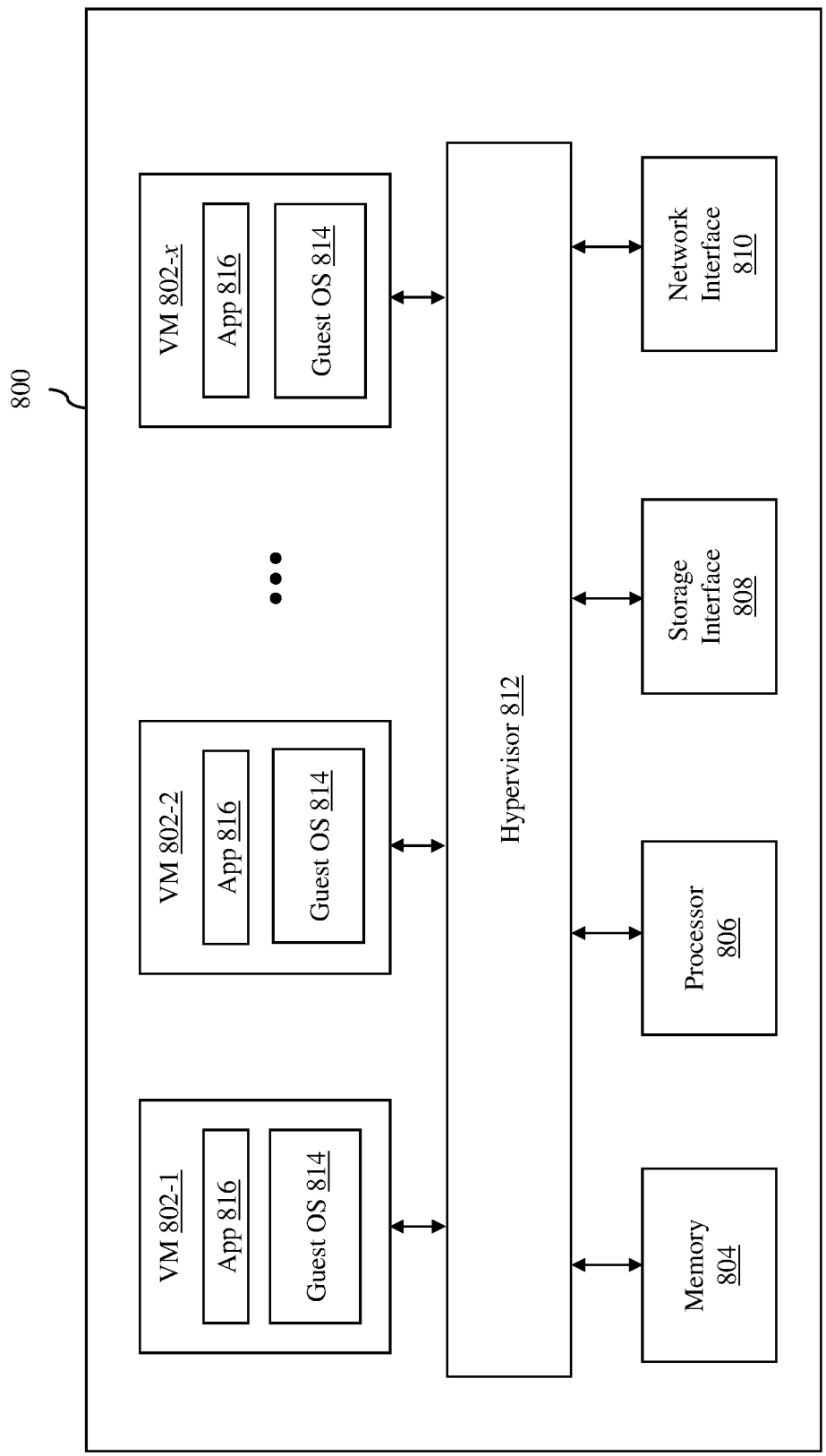
FIG. 8 is a block diagram of a host computer on which at least some components of the failure analysis system may be implemented in accordance with an embodiment of the invention.

The failure analysis system 100 may be implemented as a standalone system or implemented as part of the computing system 102. In an embodiment, the failure analysis system 100 may be implemented as software on one or more computer systems, which may be virtual or physical computer systems. A host computer 800 on which at some of the components of the failure analysis system 100 may be implemented in accordance with an embodiment of the invention is illustrated in FIG. 8. In the illustrated embodiment, the host computer 800 is configured to support a number of virtual computing instances 802-1, 802-2 . . . 802-x (where x is a positive integer). As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, Calif. A virtual container is a package that relies on virtual isolation to deploy and run applications that access a shared operating system (OS) kernel. An example of a virtual container is the virtual container created using a Docker engine made available by Docker, Inc. In the illustrated embodiment, the virtual computing instances in the host computer 800 are virtual machines (VMs). However, in other embodiments, the virtual computing instances in the host computer 800 may be other types of virtual computing instances.

The VMs 802-1, 802-2 . . . 802-x supported by the host computer 800 share at least some of the hardware resources of the host computer, which include system memory 804, one or more processors 806, a storage interface 808, and a network interface 810. The system memory 804, which may be random access memory (RAM), is the primary memory of the host computer. The processor 806 can be any type of a processor, such as a central processing unit (CPU) commonly found in a server. The storage interface 808 is an interface that allows that host computer to communicate with a storage (not shown). As an example, the storage interface may be a host bus adapter or a network file system interface. The network interface 810 is an interface that allows the host computer to communicate with other devices via a computer network. As an example, the network interface 810 may be a network adapter.

In the illustrated embodiment, the VMs 802-1, 802-2 . . . 802-x run on "top" of a hypervisor 812, which is a software interface layer that, using virtualization technology, enables sharing of the hardware resources of the host computer 800 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 814 and one or more guest applications 816. The guest operating system manages virtual system resources made available to the corresponding VM by the hypervisor 812, and, among other things, the guest operating system forms a software platform on top of which the guest applications 816 run.

The VMs 802-1, 802-2 . . . 802-x are able to communicate with each other using an internal software Open Systems Interconnection (OSI) Layer 2 switch (not shown) and with other computer systems connected to the host computer 800 using the network interface 810 of the host computer. In addition, the VMs are able to access storage using the storage interface 808 of the host computer.

Figure 9:
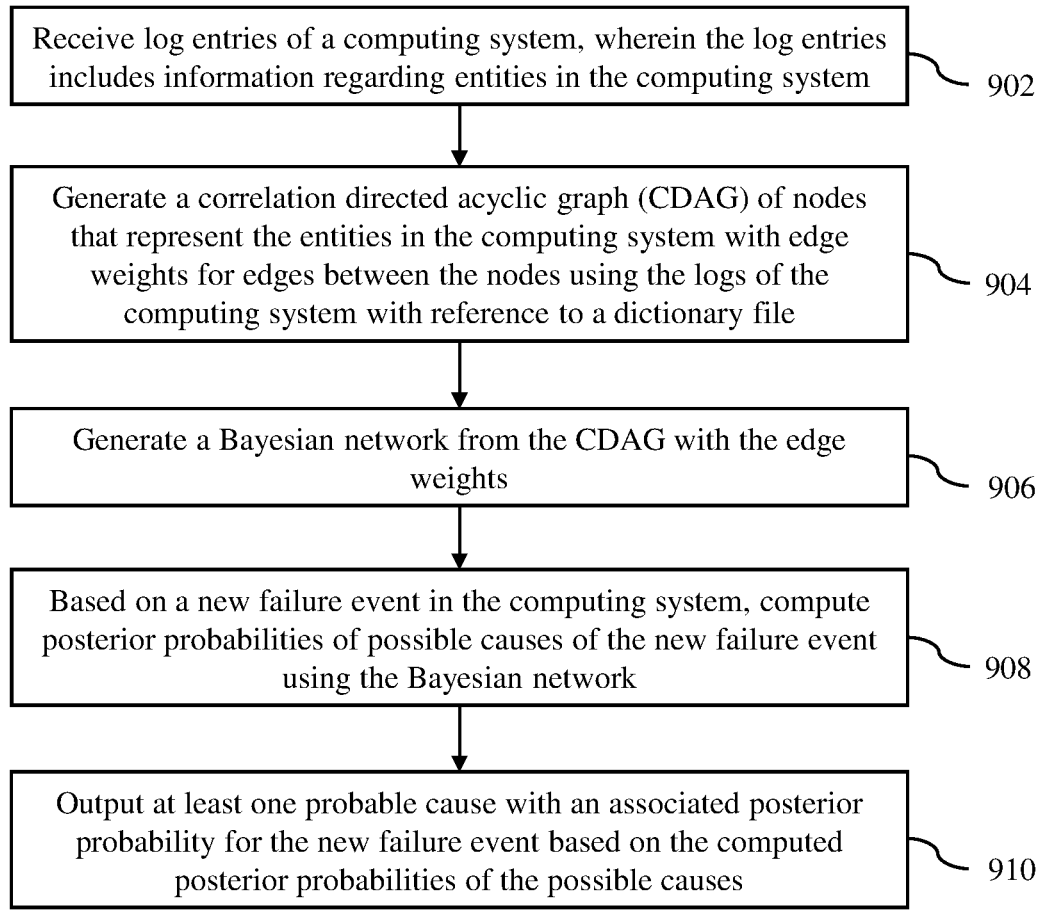
FIG. 9 is a process flow diagram of a computer-implemented method for performing a failure analysis on a computing system in accordance with an embodiment of the invention.

A computer-implemented method for performing a failure analysis on a computing system in accordance with an embodiment of the invention is described with reference to a flow diagram of FIG. 9. At block 902, log entries of the computing system are received. The log entries include information regarding entities in the computing system. At block 904, a correlation directed acyclic graph (CDAG) of nodes that represent the entities in the computing system with edge weights for edges between the nodes is generated using the log entries of the computing system with reference to a dictionary file. The dictionary file specifies entity types, dependency types of the entity types, expressions that return values representing prior probabilities of failure for the dependency types, and the edge weights for the dependency types. At block 906, a Bayesian network is generated from the CDAG with the edge weights. The Bayesian network includes conditional probabilities for edges of the Bayesian network based on the edge weights of the CDAG. At block 908, based on a new failure event in the computing system, posterior probabilities of possible causes of the new failure event are computed using the Bayesian network. The possible causes are select entities in the computing system. The posterior probability of each possible cause is based on the conditional probability of an edge of the Bayesian network associated with that possible cause and a return value of the expression for that possible cause. At block 910, at least one probable cause with an associated posterior probability for the new failure event is output based on the computed posterior probabilities of the possible causes. The probable cause is selected from the possible causes of the new failure event.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for performing a failure analysis on a computing system, the method comprising:
   receiving log entries of the computing system, wherein the log entries include information regarding entities in the computing system;
   generating a correlation directed acyclic graph (CDAG) of nodes that represent the entities in the computing system with edge weights for edges between the nodes using the log entries of the computing system with reference to a dictionary file, wherein the dictionary file specifies entity types, dependency types of the entity types, expressions that return values representing prior probabilities of failure for the dependency types, and the edge weights for the dependency types;
   generating a Bayesian network from the CDAG with the edge weights, wherein the Bayesian network includes conditional probabilities for edges of the Bayesian network based on the edge weights of the CDAG;
   based on a new failure event in the computing system, computing posterior probabilities of possible causes of the new failure event using the Bayesian network, wherein the possible causes are select entities in the computing system and wherein the posterior probability of each possible cause is based on the conditional probability of an edge of the Bayesian network associated with that possible cause and a return value of the expression for that possible cause; and
   outputting at least one probable cause with an associated posterior probability for the new failure event based on the computed posterior probabilities of the possible causes, wherein the at least one probable cause is selected from the possible causes of the new failure event.

2. The computer-implemented method of claim 1, wherein generating the Bayesian network from the CDAG with the edge weights includes reversing directions of edges in the CDAG so that the conditional probability for each edge of the Bayesian network is a probability that a failure of a starting node of that edge is caused by a target node of that edge.

3. The computer-implemented method of claim 1, wherein computing the posterior probabilities of the possible causes of the new failure event using the Bayesian network includes multiplying the conditional probability by the return value of the expression for each of the select entities.

4. The computer-implemented method of claim 1, wherein the return value of the expression for a particular possible cause is based on a status information for an entity in the computing system that corresponds to the particular possible cause.

5. The computer-implemented method of claim 1, wherein the expression is a lambda expression.

6. The computer-implemented method of claim 1, further comprising modifying the edge weights in the dictionary file based on expert feedbacks or machine learning.

7. The computer-implemented method of claim 1, wherein the log entries are offline log entries from a persistent storage or online log entries from the computing system.

8. The computer-implemented method of claim 1, wherein the new failure event is an actual failure or a hypothetical failure.

9. A non-transitory computer-readable storage medium containing program instructions for performing a failure analysis on a computing system, wherein execution of the program instructions by one or more processors of a computer system causes the one or more processors to perform steps comprising:
   receiving log entries of the computing system, wherein the log entries include information regarding entities in the computing system;
   generating a correlation directed acyclic graph (CDAG) with edge weights for the entities in the computing system using the log entries of the computing system with reference to a dictionary file, wherein the dictionary file specifies entity types, dependency types of the entity types, expressions that return values representing prior probabilities of failure for the dependency types, and the edge weights for the dependency types;
   generating a Bayesian network from the CDAG with the edge weights, wherein the Bayesian network includes conditional probabilities for edges of the Bayesian network based on the edge weights of the CDAG;
   based on a new failure event in the computing system, computing posterior probabilities of possible causes of the new failure event using the Bayesian network, wherein the possible causes are select entities in the computing system and wherein the posterior probability of each possible cause is based on the conditional probability of an edge of the Bayesian network associated with that possible cause and a return value of the expression for that possible cause; and
   outputting at least one probable cause with an associated posterior probability for the new failure event based on the computed posterior probabilities of the possible causes, wherein the at least one probable cause is selected from the possible causes of the new failure event.

10. The non-transitory computer-readable storage medium of claim 9, wherein generating the Bayesian network from the CDAG with the edge weights includes reversing directions of edges in the CDAG so that the conditional probability for each edge of the Bayesian network is a probability that a failure of a starting node of that edge is caused by a target node of that edge.

11. The non-transitory computer-readable storage medium of claim 9, wherein computing the posterior probabilities of the possible causes of the new failure event using the Bayesian network includes multiplying the conditional probability by the return value of the expression for each of the select entities.

12. The non-transitory computer-readable storage medium of claim 9, wherein the return value of the expression for a particular possible cause is based on a status information for an entity in the computing system that corresponds to the particular possible cause.

13. The non-transitory computer-readable storage medium of claim 9, wherein the expression is a lambda expression.

14. The non-transitory computer-readable storage medium of claim 9, wherein the steps further comprise modifying the edge weights in the dictionary file based on expert feedbacks or machine learning.

15. The non-transitory computer-readable storage medium of claim 9, wherein the log entries are offline log entries from a persistent storage or online log entries from the computing system.

16. The non-transitory computer-readable storage medium of claim 9, wherein the new failure event is an actual failure or a hypothetical failure.

17. A system comprising:
memory; and
at least one processor configured to:
receive log entries of a computing system, wherein the log entries include information regarding entities in the computing system;
generate a correlation directed acyclic graph (CDAG) with edge weights for the entities in the computing system using the log entries of the computing system with reference to a dictionary file, wherein the dictionary file specifies entity types, dependency types of the entity types, expressions that return values representing prior probabilities of failure for the dependency types, and the edge weights for the dependency types;
generate a Bayesian network from the CDAG with the edge weights, wherein the Bayesian network includes conditional probabilities for edges of the Bayesian network based on the edge weights of the CDAG;
based on a new failure event in the computing system, compute posterior probabilities of possible causes of the new failure event using the Bayesian network, wherein the possible causes are select entities in the computing system and wherein the posterior probability of each possible cause is based on the conditional probability of an edge of the Bayesian network associated with that possible cause and a return value of the expression for that possible cause; and
output at least one probable cause with an associated posterior probability for the new failure event based on the computed posterior probabilities of the possible causes, wherein the at least one probable cause is selected from the possible causes of the new failure event.

18. The system of claim 17, wherein the at least one processor is configured to reverse directions of edges in the CDAG when generating the Bayesian network so that the conditional probability for each edge of the Bayesian network is a probability that a failure of a starting node of that edge is caused by a target node of that edge.

19. The system of claim 17, wherein the at least one processor is configured to multiply the conditional probability by the return value of the expression for each of the select entities to compute the posterior probabilities of the possible causes of the new failure event, wherein the return value for each of the select entities is based on a status information for that select entity.

20. The system of claim 17, wherein the expression is a lambda expression.

* * * * *